O. M. TINKHAM.
Improvement in Coffee-Pots.

No. 115,134.    Patented May 23, 1871.

Witnesses.
E. H. Bates.
F. B. Curtis

Inventor
Orville M. Tinkham 115,134

UNITED STATES PATENT OFFICE.

ORVILLE M. TINKHAM, OF POMFRET, VERMONT.

IMPROVEMENT IN COFFEE-POTS.

Specification forming part of Letters Patent No. 115,134, dated May 23, 1871.

I, ORVILLE M. TINKHAM, of Pomfret, in the county of Windsor and State of Vermont, have invented certain Improvements in Apparatus for the Preparation of Tea, Coffee, or other Herbs or Kernels for Beverages, of which the following is a specification:

Nature and Objects of the Invention.

My invention relates to the method of obtaining a clarified infusion of the substances named by leaching; and it consists, in the first part, of a reservoir intended for the reception of boiling water, and so constructed with sundry minute perforations in its bottom as to gradually supply the same to the substance to be leached in the proper quantities for extracting its strength. The second part relates to the filtering of the infusion as obtained by means of a removable bottom of flannel or other textile fabric, or of metal, or of both combined, placed at the bottom of a cup containing the substance to be leached, attached and secured as hereinafter described, and removable for cleansing or renewal.

Description of the Accompanying Drawing.

Figure 1:
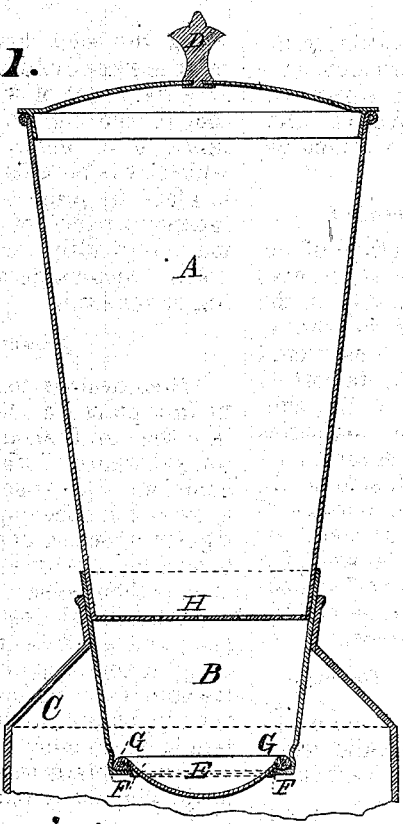
Figure 2:
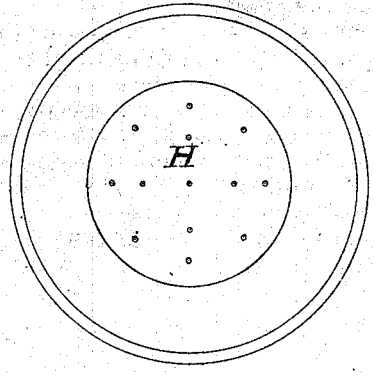

Figure 1 is a section of my machine as shown by dividing it in half perpendicularly. Fig. 2 shows the reservoir, viewed vertically.

General Description.

A is the reservoir, calculated to receive a quantity of boiling water equal to the amount of infusion required, and which has in its bottom H sundry minute perforations, as shown in H, Fig. 2, of suitable size and location for the gradual supply of the water in proper quantities to the substance to be leached, which is contained in the cup B, into the top of which the bottom of the reservoir A closely fits, as shown by the dotted line, where it is held in place by friction. C C is a broken section of an ordinary coffee-pot, into the top of which the leach fits closely, thereby preventing the escape of aroma through that medium. D is the cover of the reservoir. E is the bottom of the cup B, composed of any textile fabric, or of metal, or of both combined, and which rests on a flange, F F, where it is held in place by projections or beads G G, on the interior surface of the cup B, over which it may be readily forced, thereby making the bottom removable for the purposes of cleansing or renewal.

Directions for Use.

When desired for use the bottom E should be first placed in the position described; then into the cup B should be placed a quantity of the substance of which the infusion is desired, sufficient to give the required quantity of proper strength; the cup should then be pressed tightly upon the bottom of the reservoir A, as shown by the dotted line in Fig 1. The leach should then be set in the top of the coffee-pot or other vessel designed to receive the infusion, and a sufficient quantity of boiling water to give the amount of infusion desired put into the reservoir, on which the cover D should then be placed, when it will act automatically, requiring no more attention.

I do not claim the filter or any improvement in the material composing the same.

Claims.

I claim—

1. The cup B, with flange F, projection G, and filter E, when combined and operating as described.

2. The reservoir A, with its perforated bottom H, combined with cup B and its filtering bottom, in manner set forth.

ORVILLE M. TINKHAM.

Witnesses:
ELLERY C. FORD,
O. HOWARDE MCKEE.